Aug. 15, 1967 S. R. OVSHINSKY 3,336,486
CONTROL SYSTEM HAVING MULTIPLE ELECTRODE
CURRENT CONTROLLING DEVICE
Filed Sept. 6, 1966 2 Sheets-Sheet 1

Inventor
Stanford R. Ovshinsky
By: Wallenstein, Spangenberg, Hattis & Strampel attys Aug. 15, 1967   S. R. OVSHINSKY   3,336,486
CONTROL SYSTEM HAVING MULTIPLE ELECTRODE
CURRENT CONTROLLING DEVICE
Filed Sept. 6, 1966   2 Sheets-Sheet 2
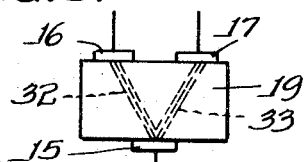
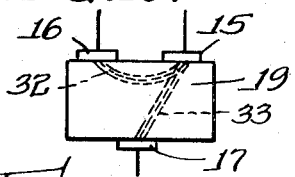
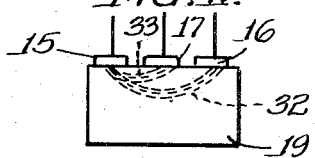
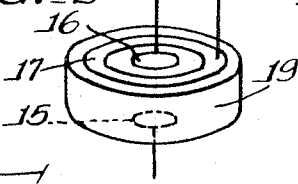
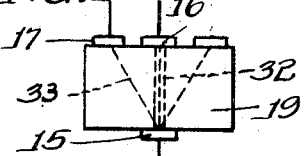
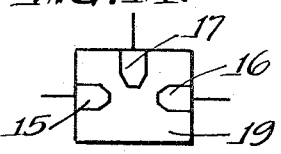
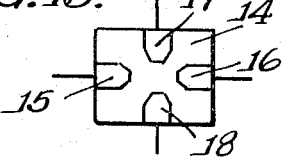
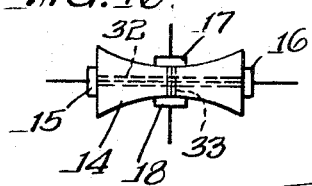
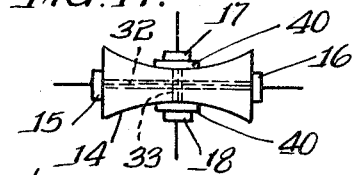
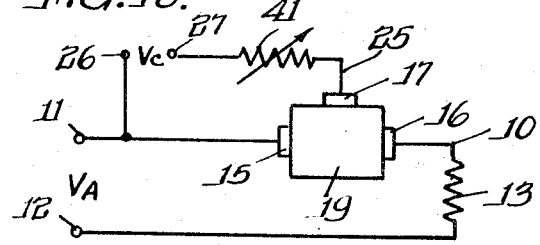
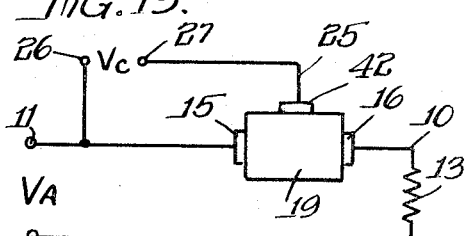
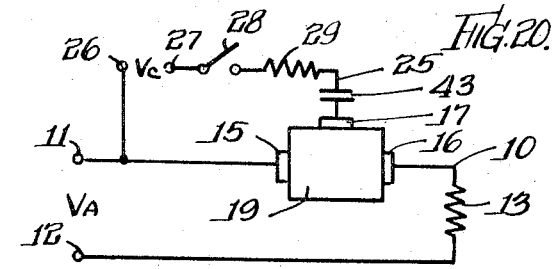
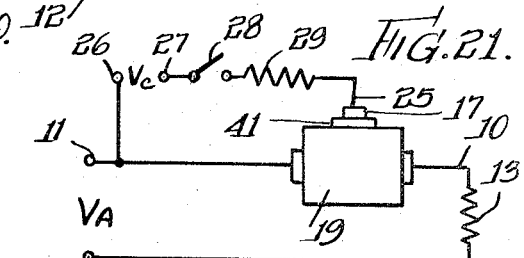
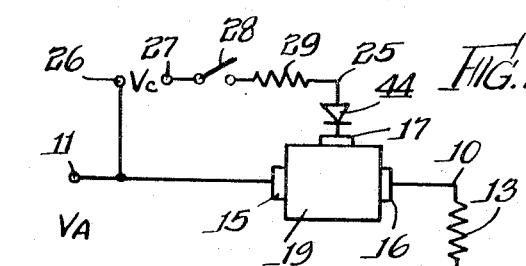
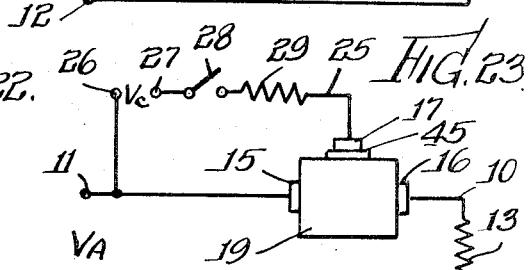
Inventor
Stanford R. Ovshinsky
By: Wallenstein, Spangenberg, Hattis & Strampel
attys

United States Patent Office 3,336,486
Patented Aug. 15, 1967

3,336,486
CONTROL SYSTEM HAVING MULTIPLE
ELECTRODE CURRENT CONTROLLING
DEVICE
Stanford R. Ovshinsky, Bloomfield Hills, Mich., assignor to Energy Conversion Devices, Inc., Troy, Mich., a corporation of Delaware
Filed Sept. 6, 1966, Ser. No. 577,397
23 Claims. (Cl. 307—88.5)

This application is a continuation-in-part of copending application Ser. No. 310,407 filed Sept. 20, 1963, now Patent No. 3,271,591, which in turn is a continuation-in-part of applications Ser. No. 118,642 filed June 21, 1961, now abandoned; Ser. No. 226,843 filed Sept. 28, 1962, now abandoned; Ser. No. 252,510 filed Jan. 18, 1963, now abandoned; Ser. No. 252,511 filed Jan. 18, 1963, now abandoned; Ser. No. 252,467 filed Jan. 18, 1963, now abandoned; and Ser. No. 288,241 filed June 17, 1963, now abandoned.

The principal object of this invention is to provide a current controlling device for electrical load circuits which operates as a "switching" device for substantially instantaneously "closing" and "opening" the electrical load circuits by means of control circuits electrically connected through control electrodes to the current controlling device.

The current controlling devices may be like those referred to as "Mechanism" and "Hi-Lo" devices in the aforementioned patent applications, the "Mechanism" devices being non-memory devices requiring a holding current for maintaining the same in their conducting state or condition, and the "Hi-Lo" devices being memory devices which do not require a holding current for maintaining the same in the conducting state or condition.

Briefly, in accordance with this invention, these devices include a non-rectifying semiconductor material and load electrodes in non-rectifying contact therewith for connecting the same in series in the load circuit which is powered by a load voltage source. The devices have two states or conditions, a blocking state or condition and a conducting state or condition. In the blocking state or condition they are of high resistance and block the current substantially equally in each direction, and in the conducting state or condition they are of low resistance and conduct the current substantially equally in each direction.

The devices have a threshold voltage value depending upon their make-up, materials, dimensions and configurations and, when in their blocking state or condition, they remain in their blocking state or condition until the threshold voltage value thereof decreases to the value of the voltage applied to the load electrodes by the load voltage source, whereupon the devices substantially instantaneously change to their conducting state or condition. The devices include at least one control electrode, such as one or two, electrically associated with the semiconductor material, and a control circuit including a control voltage source electrically coupled to said at least one control electrode applies a voltage to the semiconductor material for lowering the threshold voltage value of the devices to the value of the voltage applied to the load electrodes by the load voltage source for substantially instantaneously changing the devices from their blocking state or condition to their conducting state or condition.

The non-memory type devices are maintained in their conducting state or condition by the current therethrough above a minimum current holding value and are immediately changed to their blocking state or condition when the current therethrough decreases below the minimum current holding value. The control circuit may also have a controlling effect on the minimum current holding value. The memory type devices remain in their conducting state or condition even though the current therethrough decreases to zero, and, here, a second control circuit, including a control current source, is coupled to said at least one control electrode for applying a current pulse to the semiconductor material for changing the same to its blocking state or condition.

The load circuit may be a steady D.C., pulsating D.C. of A.C. load circuit and, likewise the control circuit may be a steady D.C., pulsating D.C. or A.C. control circuit. The control circuit may be a high resistance circuit, and in this respect the control electrodes may be high resistance electrodes, for substantially isolating the control circuit from the load circuit. Where the control circuit is an A.C. or pulsating D.C. circuit, the control circuit may include a series connected capacitor, or insulation between said at least one control electrode and the semiconductor material, for D.C. isolating the control circuit from the load circuit. The control circuit may also include a rectifier, or a rectifying junction between said at least one control electrode and the semiconductor material, for regulating the application of the control circuit voltage to the devices, if this be desired.

The control circuit may also be provided with condition responsive control elements having condition-resistance coefficients, or said at least one control electrode may be condition responsive having condition-resistance coefficients, for regulating the control voltage applied by said at least one control electrode to the semiconductor material for controlling the threshold voltage value of the device in accordance with the value of the condition affecting the control elements or the control electrodes. The condition-resistance coefficients may be negative or positive and the particular conditions may be moisture, pressure, light, temperature or the like. Likewise, the control circuit for the memory devices, which switch such devices from the conducting state or condition to the blocking state or condition by applying current pulses to the semiconductor material thereof, may also include condition-responsive control elements or control electrodes for regulating the value of such current pulses and, hence, the switching of such devices to their blocking state or condition.

Other objects and advantages of this invention will become apparent to those skilled in the art upon reference to the accompanying specification, claims and drawings in which:

Figure 2:
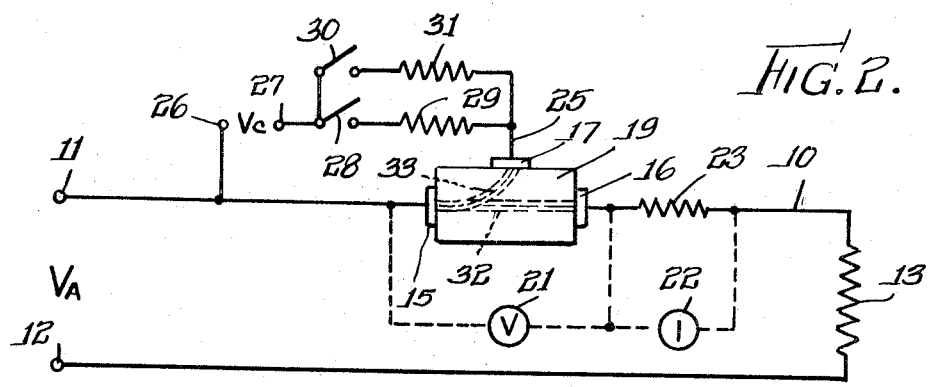
FIG. 2 is a wiring diagram like that of FIG. 1 but utilizing a current controlling device having a pair of load electrodes and a single control electrode, i.e. a three electrode device.
Figure 5:
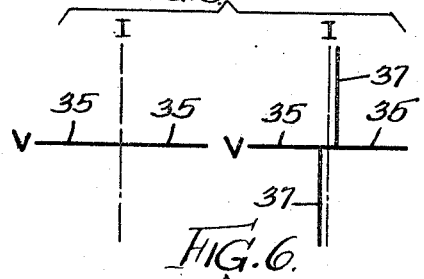
Figure 7:
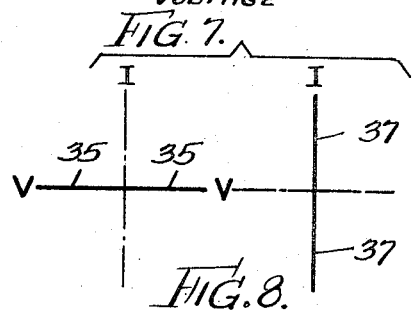
Figure 6:
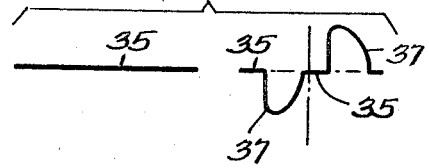
Figure 8:
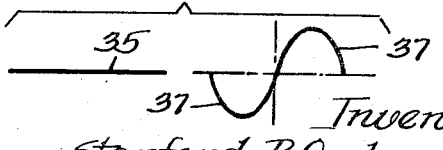

FIG. 5 constitutes voltage-current curves illustrating the operation of the non-memory type current controlling device when included in an A.C. load circuit;

FIG. 6 constitutes time-current curves illustrating the operation of the non-memory type current controlling device when included in an A.C. circuit;

FIG. 7 constitutes voltage-current curves illustrating the operation of the memory type current controlling device when included in an A.C. load circuit;

FIG. 8 constitutes time-current curves illustrating the operation of the memory type current controlling device when included in an A.C. load circuit;

FIGS. 9 to 14 illustrate various forms which the three electrode type current controlling device may take, FIG. 13 being a side elevational view of the device illustrated in perspective in FIG. 12;

FIGS. 15, 16 and 17 illustrate various forms which the four electrode device may take; and FIGS. 18 to 22 are wiring diagrams similar to that of FIG. 2 but illustrating various modifications in the control circuit and control electrodes.

Figure 1:
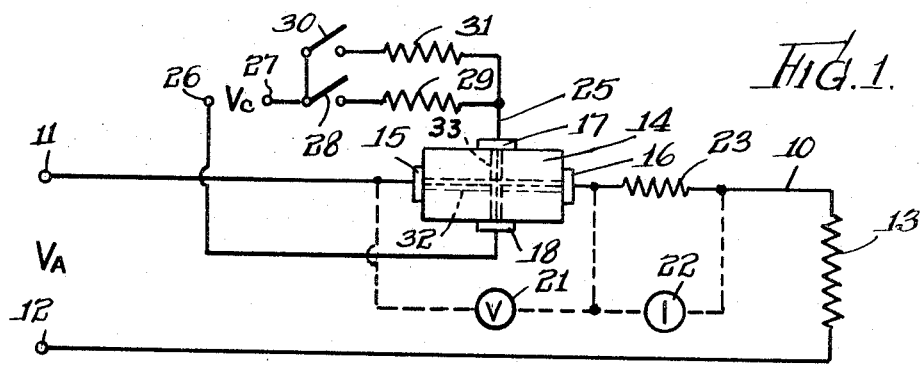
FIG. 1 is a wiring diagram of one form of the control system of this invention wherein the current controlling device includes a pair of load electrodes and a pair of control electrodes, i.e. a four electrode device.

Referring first to FIG. 1, a load circuit is generally designated at 10, the load circuit being connected to terminals 11 and 12 which in turn are connected to a load voltage source $V_A$ for applying a voltage to the load circuit. The load voltage source may be a steady D.C., A.C. or pulsating D.C. source and it may be a fixed source or a variable source as desired. Included in the load circuit 10 is a load resistance or impedance 13 which may be a resistor, a coil, a motor winding, a solenoid valve, a relay winding, or the like. A four electrode current controlling device 14 is connected in series in the load circuit 10 by load electrodes 15 and 16. The current controlling device also has a pair of control electrodes 17 and 18 which connect the current controlling device 14 in series in a control circuit 25. The control circuit 25 includes a pair of terminals 26 and 27 which are in turn connected to a control voltage source $V_C$ for applying voltage and current to the control circuit 25. Here, also, the control voltage source may be a steady D.C., A.C. or pulsating D.C. voltage and, here, also, the control voltage source may be fixed or variable. The terminal 27 is connected through a switch 28 and a relatively high resistance 29 to the control electrode 17 and the control electrode 18 is connected to the other terminal 26. This control circuit is utilized for switching the control device 14 from its blocking state or condition to its conducting state or condition and is utilizable with both the non-memory and memory type devices. The terminal 27 may also be connected through a switch 30 and a relatively low resistance 31 to the control electrode 17 and this branch of the control circuit may be utilized for switching the memory type devices from their conducting state or condition to their blocking state or condition.

In order to illustrate the manner of operation of the current controlling device 14 it may be connected as shown in dotted lines to the voltage and current traces of an oscilloscope, the voltage trace 21 being connected across the device 14 and the current trace 22 being connected across a resistance 23 in the load circuit 10. Thus, by utilizing both voltage and current traces the oscilloscope may illustrate the voltage-current curves as illustrated in FIGS. 3, 4, 5, and 7. If only the current curve is to be illustrated as in FIGS. 6 and 8, the current trace 22 of the oscilloscope is arranged against time to provide the time-current curves of FIGS. 6 and 8.

FIG. 2 is the same as FIG. 1 and what has been said above in connection with FIG. 1 applies equally as well here. However, in FIG. 2 there is utilized a three electrode type device 19 having only one control electrode 17. Here, the load electrode 15 also acts as a control electrode and is connected to the terminal 26 of the control voltage source. The dotted lines 32 in FIGS. 1 and 2 illustrate the current density and field between the load electrodes 15 and 16 and the dotted lines 33 illustrate the current density and field between the control electrodes 17 and 18 in FIG. 1 and between the control electrode 17 and load electrode 15 in FIG. 2.

The current controlling devices 14 and 19 of this invention are symmetrical in operation and, as expressed above, they may be generally of the non-memory type and of the memory type referred to as "Mechanism" devices and "Hi-Lo" devices, respectively, in the aforementioned copending applications. They contain non-rectifying semiconductor materials, as distinguished from multilayer diodes having p-n junctions, and load electrodes 15 and 16 in non-rectifying contact therewith for controlling the current therethrough substantially equally in each direction. In their high resistance or blocking state or condition the semiconductor materials of the memory type devices are polymeric type materials which are in the disordered and generally amorphous state or condition. In their high resistance or blocking state or condition the semiconductor materials for the non-memory devices may be crystalline like materials. Here, it may be necessary to give consideration to purities to achieve high resistance in the blocking state or condition. Here, also, as in the case of amorphous materials, it is necessary to prevent rectifying barrier and p-n junction formation. Preferably, materials of the polymeric type which are in a disordered and generally amorphous state or condition are utilized for the non-memory type devices as well as for the memory type devices. Such polymeric type materials include polymeric networks and the like having covalent bonding and crosslinking resistant to crystallization, which are in a locally organized disordered state or condition which is generally amorphous (not crystalline) but which may possibly contain relatively small crystals or chain or ring segments which would probably be maintained in randomly oriented position therein by the crosslinking. These polymeric structures may be one, two or three dimensional structures. Such a structure may comprise a composition of a plurality of chemically dissimilar elements, at least some of which are of the polymeric type having the ability to form covalent chain or ring like and crosslink bonds. Such polymeric type elements include boron, carbon, silicon, germanium, tin, lead, nitrogen, phosphorous, arsenic, antimony, bismuth, oxygen, sulphur, selenium, tellurium, hydrogen, fluorine and chlorine. Of these polymeric type elements, oxygen, sulphur, selenium and tellurium are particularly useful since they, and mixtures containing them, have quite low and favorable carrier mobility characteristics. Of these polymeric type elements, silicon, germanium, phosphorous, arsenic and the like and, also, aluminum, gallium, indium, thallium, lead, bismuth and the like are particularly useful since they effectively form covalent bonds or crosslinks between polymeric like chain or ring segments to return or maintain the latter in the disordered and generally amorphous state or condition.

Pluralities of the aforementioned elements may be combined with each other and/or with other elements in appropriate percentages to provide the disordered polymeric like amorphous structure. While many different materials may be utilized, for example, these materials can be tellurides, selenides, sulfides or oxides of substantially any metal, or metalloid, or intermetallic compound, or semiconductor, or solid solutions or mixtures thereof, particularly good results being obtained where tellurium or selenium are utilized and where oxides of the transition metals, such as, vanadium, tantalum, niobium and zirconium and mixtures thereof are utilized.

The semiconductor materials may be chosen to provide an intermolecular band structure having large numbers of current carrier restraining centers (defects or recombination centers or traps) by virtue of disordered chain or ring structure or disordered atomic structure, and this may be enhanced by treating the same in various ways, as disclosed in the aforementioned applications, to provide the high resistance or blocking state or condition. Some typical examples of the semiconductor materials which may be utilized here are set forth in the aforementioned applications and need not be repeated here. However, for purposes of explanation herein, the semiconductor material for the non-memory devices may comprise a composition including about 65% tellurium, 24% arsenic, 7% germanium and 4% silicon by weight, and the semiconductor material for the memory devices may comprise a composition including about 90% tellurium and 10% germanium by weight.

Manners of making the current controlling devices are also set forth in the aforementioned applications and need not be repeated here. Briefly the semiconductor materials may be in the form of bodies, wafers, layers or films and they are arranged between the load electrodes for connecting the same in series in the load circuit. The semiconductor materials may be formed into the bodies, wafers, layers or films by casting from a molten condition, by cutting from an ingot, by extruding from an ingot, by vacuum deposition, by sputtering and the like. The load electrodes may be made of substantially any good electrical conductor, preferably high melting point materials, such as tantalum, graphite, niobium, tungsten and molybdenum. These electrodes are usually relatively inert with respect to the various semiconductor materials. They may be applied to the bodies, wafers, layers or films of the semiconductor material in any desired manner, as by mechanically pressing them in place, by soldering them in place, by vapor deposition, by sputtering or the like. Conversely, the semiconductor materials may be applied to the electrodes by coating, vapor depositing or sputtering the semiconductor materials thereon.

It is believed that the generally amorphous polymeric like semiconductor materials of the memory and non-memory type of devices have substantial current carrier restraining centers (traps, recombination centers or the like) providing a rapid rate of recombination of current carriers (electrons and/or holes) and a relatively large energy gap, that they have a relatively small mean free path for the current carriers, large spatial potential fluctuations affecting the recombination rate and relatively few free current carriers due to the amorphous structure and the current carrier restraining centers therein for providing the high resistance or blocking state or condition. It is also believed that the crystalline like materials of the non-memory type devices in their high resistance or blocking state or condition have substantial current carrier restraining centers (traps, recombination centers or the like) providing a rapid rate of recombination of current carriers (electrons and/or holes) and have a relatively large mean free path for the current carriers due to the crystal lattice structure and hence a relatively high current carrier mobility, but that there are relatively few free current carriers due to the substantial current carrier restraining centers therein, a relatively large energy gap therein, and large spatial potential fluctuations therein affecting the recombination rate for providing the high resistance or blocking state or condition. It is further believed that the amorphous type semiconductor materials may have a higher resistance at the ordinary and usual temperatures of use, a greater non-linear negative temperature-resistance coefficient, a lower heat conductivity coefficient, and a greater change in electrical conductivity between the blocking state or condition and the conducting state or condition than the crystalline type of semiconductor materials, and thus be more suitable for many applications of this invention. By appropriate selection of materials, dimensions and configurations, the high resistance values and the threshold voltage values of the current controlling devices may be predetermined.

Figure 3:
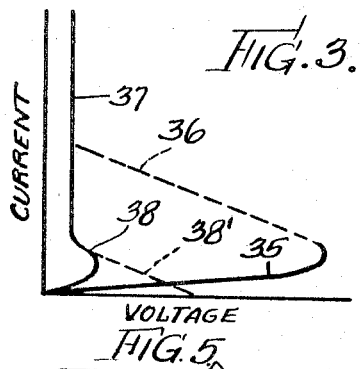
FIG. 3 is a voltage-current curve illustrating the instantaneous voltage and current characteristics of the current controlling devices of this invention with a varying D.C. voltage applied thereto wherein the devices are of the non-memory type.
Figure 4:
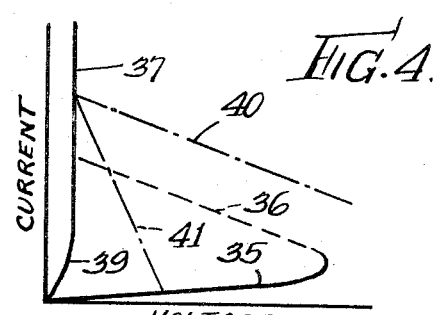
FIG. 4 is a voltage-current curve illustrating the instantaneous voltage and current characteristics of the current controlling devices of this invention with a varying D.C. voltage applied thereto wherein the devices are of the memory type.

When the current controlling devices 14, 19 are connected in series by the load electrodes 15 and 16 into the load circuit 20 to which a variable D.C. voltage source is applied by the terminals 11 and 12, they behave in the manner shown by the voltage-current curves of FIG. 3 for the non-memory devices and by the voltage-current curves of FIG. 4 for the memory devices. Assuming the devices 14, 19 to be in their blocking state or condition, as the applied voltage is gradually increased from zero, the current density and field between the electrodes 15 and 16 increases, the rate of injection of the current carriers increases and the resistance of at least portions or paths 32 of the semiconductor material between the electrodes decreases as indicated at 35 in FIGS. 3 and 4. When the voltage applied to the electrodes increases to a value corresponding to the voltage threshold value of the device, said at least portions or paths 32 of the semiconductor material between the electrodes (at least one path or filament or thread between the electrodes) are substantially instantaneously changed to a low resistance or conducting state or condition for conducting current therethrough. It is believed that the applied voltage causes firing or breakdown or "switching" of said at least portions or paths of the semiconductor material, and that the breakdown may be electrical or thermal or a combination of both, the electrical breakdown caused by the electrical field or voltage being more pronounced where the distance between the electrodes is small, and the thermal breakdown caused by the electrical field or voltage being more pronounced for greater distances between the electrodes. The "switching" times for switching from the blocking state or condition to the conducting state or condition are extremely short, substantially instantaneous. The substantially instantaneous switching of said at least portions or paths of the semiconductor material from their high resistance or blocking state or condition to their low resistance or substantially conducting state or condition is depicted by the dotted curves 36 of FIGS. 3 and 4.

The electrical breakdown may be due to rapid release, multiplication and conduction of current carriers in avalanche fashion under the influence of the applied electrical field or voltage, which may result from external field emission, such as, injection of current carriers from the electrodes (electrons being injected from the negative electrode and/or holes being injected from the positive electrode), internal field emission, such as, avalanche injection or the like, impact or collision ionization from current carrier restraining centers (traps, recombination centers or the like), impact or collision ionization from valence bands, much like that occurring at breakdown in a gaseous discharge tube, or by lowering the height or decreasing the width of possible potential barriers and tunneling or the like may also be possible. It is believed that the local organization of the atoms and their spatial relationship in the crystal lattices in the crystalline type materials and the local organization and the spatial relationship between the atoms or small crystals or chain or ring segments in the amorphous type materials, at breakdown, are such as to provide a minimum number of inelastic collisions for the current carriers which allows adequate acceleration of the free current carriers by the applied electrical field or voltage to provide the impact or collision ionization in connection with the electrical breakdown and conduction. It is also believed that such a minimum number of inelastic collisions for the current carriers may be inherently present in the amorphous structure and that the current conducting condition is greatly dependent upon the local organization for both the amorphous and crystalline conditions. As expressed above a relatively large mean free path for the current carriers can be present in the crystalline structure.

The thermal breakdown may be due to Joule heating of said at least portions or paths of the semiconductor material by the applied electrical field or voltage, the semiconductor material having a substantial non-linear negative temperature-resistance coefficient and a minimal heat conductivity coefficient, and the resistance of said at least portions or paths of the semiconductor material rapidly decreasing upon such heating thereof. In this respect, it is believed that such decrease in resistance increases the current and rapidly heats by Joule heating said at least portions or paths of the semiconductor material to thermally release and emit the current carriers to be accelerated in the mean free path by the applied electrical field or voltage to provide for rapid release, multiplication and conduction of current carriers in avalanche fashion and, hence, breakdown and conduction, and, especially in the amorphous condition, the overlapping of orbitals by virtue of the type of local organization can create different sub-bands in the band structure.

It is also believed that the current so initiated between the electrodes at breakdown (electrically, thermally or both) causes at least portions or paths of the semiconductor material between the electrodes to be substantially instantaneously heated by Joule heat, that at such increased temperatures and under the influence of the electrical field or voltage, further current carriers are released, multiplied and conducted in avalanche fashion to provide high current density, and a low resistance or conducting state or condition which remains at a greatly reduced applied voltage. It is possible that the increase in mobility of the current carriers at higher temperature and higher electric field strength is due to the fact that the free current carriers being excited to higher energy states populate bands of lower effective mass and, hence, higher mobility than at lower temperatures and electric field strengths. The possibility for tunneling increases with lower effective mass and higher mobility. It is also possible that a space charge can be established due to the possibility of the current carriers having different masses and mobilities and since an inhomogeneous electric field could be established which would continuously elevate current carriers from one mobility to another in a regenerative fashion. As the current densities of the devices decrease, the current carrier mobilities decrease and, therefore, their capture possibilities and the effectiveness of the recombination of the excess current carriers increase. It is also possible that in the conducting state or condition the current carriers would be more energetic than their surroundings and would be considered as being hot. It is not clear at what point the minority carriers present could have an influence on the conducting process, but there is a possibility that they may enter and dominate, i.e. become majority or controlling carriers at certain critical levels.

It is further believed that the amount of increase in the mean free path for the current carriers in the amorphous like semiconductor material and the increased current carrier mobility are dependent upon the amount of increase in temperature and field strength, and it is possible that said at least portions or paths of some of the amorphous like semiconductor materials are electrically activated and heated to at least a critical transition temperature, such as a glass transition temperature, where softening begins to take place. Thus, due to such increase in mean free path for the current carriers, the current carriers produced and released by the applied electrical field or voltage are rapidly released, multiplied and conducted in avalanche fashion under the influence of the applied electrical field or voltage to provide and maintain a low resistance or conducting state or condition.

The voltage across the non-memory type device 14, 19 in its low resistance or conducting state or condition is shown by the substantially straight curve 37 in FIG. 3 and it has a substantially constant ratio of voltage change to current change and conducts current at a substantially constant voltage above a minimum current holding value which is adjacent the bottom of the substantially straight curve 37. The voltage is substantially the same for increase and decrease in current above the minimum current holding value as shown by the curve 37. In this connection, it is believed that the conducting filaments or threads or paths 32 between the electrodes increase and decrease in cross section as the current increases and decreases for providing the substantially constant voltage condition. When, however, the applied D.C. voltage is lowered to a value to decrease the current to a value below said minimum current holding value, the low resistance conducting condition follows substantially the curve 38 and immediately causes realteration and switching to the high resistance blocking condition. The realtering and switching may continue along the curve 38 which sometimes occurs where alternating current is being switched, or the realteration and switching may be substantially instantaneous as shown by the broken line 38' which usually occurs when direct current is being switched. In either event, the decrease in current to a value below the minimum current holding value immediately causes realtering of the low resistance conducting condition to the high resistance blocking condition. The device will remain in its blocking condition until switched to its conducting condition by the application of a threshold voltage. The voltage-current characteristics are not drawn to scale in FIG. 3 but are merely illustrative, for the ratio of blocking resistance to the resistance in the conducting state or condition is usually larger than 100,000:1. In its low resistance or conducting state or condition the resistance may be as low as 1 ohm or less as determined by the small voltage drop thereacross and the holding current for the device may be very small.

The memory type current controlling device is switched from its high resistance or blocking condition to its low resistance or conducting condition as described above and the low resistance conducting condition is illustrated by the curve 37 in FIG. 4. The device has memory of this conducting condition and will remain in this conducting condition even when the applied voltage is decreased to zero or reversed in polarity until switched to its blocking condition as hereafter described, and when the voltage is substantially decreased or removed the current flow is along the curve 39 in FIG. 4. The lower portion 39 of the low resistance conducting curve is substantially ohmic while the upper portion 37 of the curve, in some instances, has a substantially constant voltage characteristic as shown and, in other instances, has a substantially ohmic characteristic providing a slight slope thereto. The load line of the circuit is illustrated at 40 in FIG. 4, it being substantially parallel to the line 36. When a current is applied independently of the load circuit 20 to the memory type device as by closing the switch 30 in FIGS. 1 and 2, the load line for such current is along the line 41 since the resistance 31 in this circuit is small, and the load line 41 intersects the curve 35, the conducting condition of the memory device is immediately realtered and switched to its blocking condition. The memory device will remain in its blocking condition until switched to its conducting condition by the reapplication of a threshold voltage.

With respect to the memory type device, it is believed that in switching to the conducting state said at least portions or paths 32 of the semiconductor material are electrically activated and heated by Joule heat to at least a critical transition temperature, such as a glass transition temperature where softening begins to take place, and that at such elevated temperatures crystallization takes place in said at least portions or paths of the semiconductor material and they assume a static condition, i.e., a more ordered polymeric like crystalline solid state condition which possibly may contain relatively large crystals or packed chains or rings or a condition approaching the more ordered polymeric like crystalline condition which may be caused by dipole movement and alignment of the chain or ring segments. Both of these are herein termed the more ordered crystalline structure and both of these are frozen in to provide the low resistance or conducting state having memory of this condition even after the applied electrical field or voltage is decreased or removed or reversed in polarity. The chain or ring segments may be actuated to the disordered or amorphous condition by the application of a different electrical field.

In their low resistance or conducting state, said at least portions or paths of the memory type semiconductor material (threads or filaments or paths) having said more ordered crystalline like solid state condition are closely enclosed or encased in the remaining solid state semiconductor material having the aforementioned disordered polymeric like solid state condition which has relatively high electrical resistance and relatively low heat conductivity. When electrical energy is applied to the control electrodes 17, 18 of FIG. 1 or 17, 15 of FIG. 2 through the relatively low impedance 31, a large current flow of at least a threshold value is caused to flow through paths 33 and at least part of said portions or paths 32 of the solid state semiconductor material where the overlap to generate, by Joule heat, substantial heat therein, dissipation of heat therefrom being held to a minimum by the immediately surrounding material having the disordered polymeric like structure. It is believed that at least part of said portions or paths 32 of the semiconductor material are heated above the aforementioned critical transition temperature and that such heating causes a substantial sharp temperature differential between the ordered crystalline structure of said portions or paths and the immediately enclosing or encasing disordered amorphous structure. As a result, it is believed that the relatively large crystals or packed chains or rings of the ordered crystalline structure of said at least portions or paths of the semiconductor material are so thermally vibrated and shocked or stressed to break them up into relatively small crystals or chain or ring segments (to decrease the crystallization forces with respect to the crystal inhibiting forces) and form the highly disordered amorphous structure to provide the high resistance or blocking state therein. In this respect, it is believed that when a crystal or chain or ring in said at least portions or paths 32 of the semiconductor material are so ruptured or broken, the electrical energy is caused to flow through the remaining crystals or chains or rings to additionally heat them so that the rupturing or breaking of the crystals or chains or rings takes place in avalanche fashion and substantially instantaneously causes said at least portions of the semiconductor material to return to the high resistance or blocking condition.

It is also possible when said at least portions or paths 32 of the semiconductor material are so activated and heated by the high current that they are heated to a softened or molten condition, that the current path therethrough is interrupted at a point therein to block the flow of current therethrough, and that as a result of such interruption of the current flow said at least portions or paths of the semiconductor material rapidly cool and assume the highly disordered amorphous state. Said at least portions or paths of the semiconductor material may also be rapidly cooled by externally interrupting or rapidly decreasing the high current therethrough as by opening the switch 30. The switching between the conducting and blocking states or conditions is reversible and long lasting.

In the memory devices, the low resistance or conducting state, which is a static crystalline like condition, remains after the applied electrical field or voltage is decreased or removed or reversed, while in the Mechanism devices, the low resistance or conducting state exists only while a sustaining electrical field or voltage is applied.

It is believed that in the amorphous type semiconductor materials of this invention there are always present crystal inhibiting or disrupting forces (crosslinking and the like in the polymeric structure) which always tend to cause the semiconductor materials to assume their highly disordered or generally amorphous solid state condition and that, upon being activated by the applied threshold field or voltage and heating said at least portions or paths of the semiconductor materials, the crystal inhibiting or disrupting forces are decreased and crystallization forces are brought into play which tend to cause said at least portions or paths of the semiconductor materials to assume their more ordered crystalline like solid state condition. Whether or not said at least portions or paths of the semiconductor materials change to and remain in their more ordered or crystalline like solid state condition or remain in their disordered or generally amorphous solid state condition (although in a dynamically more ordered solid state condition), depends, it is believed, upon the relative strengths of the crystal inhibiting or disrupting forces and the crystallization forces. The devices without memory and using amorphous materials always remain in the disordered or generally amorphous condition. In the memory devices where the crystallization forces are sufficiently strong to cause said at least portions or paths of the semiconductor materials to change to and remain in their more ordered crystalline like condition, these crystallization forces may be controlled and decreased sufficiently to allow the ever present crystal inhibiting or disrupting forces to return said at least portions or paths of the semiconductor materials to their disordered or generally amorphous solid state condition.

The voltage-current characteristics of the non-memory and memory type current controlling devices are reversible and are independent of whether D.C. or A.C. is used to traverse the I–V curves of FIGS. 3 and 4. The manner in which the non-memory type current controlling device operates in the load circuit 10 of FIGS. 1 and 2 powered by an A.C. voltage source applied to the terminals 11 and 12 is illustrated by the voltage-current curve of FIG. 5 and the time-current curve of FIG. 6. When the current controlling device is in its high resistance or blocking state or condition and the applied A.C. voltage is less than the threshold or breakdown voltage value of the device, the device remains in its high resistance or blocking state or condition as indicated at 35 in the left hand portion of FIGS. 5 and 6.

When, however, the applied A.C. voltage becomes at least as great as the threshold voltage value of the non-memory type device 14, 19, the device initially and substantially instantaneously switches to its low resistance or conducting state or condition as indicated at 37 in the right hand portions of FIGS. 5 and 6. It is noted that the curves 70 in FIG. 5 are slightly offset from the center which represents the small and substantially constant voltage drop thereacross in its low resistance or conducting state or condition. It is also noted at 35 in the right hand portions of FIGS. 5 and 6 that the device intermittently assumes its high resistance or blocking state or condition during each half cycle of the A.C. voltage as the instantaneous A.C. voltage nears zero, the current being momentarily interrupted during each half cycle. However, following each momentary interruption of the current flow the increasing instantaneous voltage of the applied A.C. voltage reactivates said at least portions or paths of the semiconductor material to cause the device substantially immediately to reconduct during each half cycle and provide a modified current conduction as illustrated in the right hand portions of FIGS. 5 and 6. When, however, the applied A.C. voltage becomes less than the threshold voltage value of the device, the applied A.C. voltage does not generate sufficient power to reactivate said at least portions of the semiconductor material sufficiently to cause them to reconduct. The device then assumes its high resistance or blocking state or condition as exhibited by the voltage-current curve of the left hand portion of FIG. 5 and by the left hand portion of the time-current curve of FIG. 6. After the current controlling device becomes non-conducting, it cannot again become conducting until the applied A.C. voltage becomes at least as great as the threshold voltage value of the device to produce the voltage-current curve of FIG. 5.

The manner in which the memory type current controlling device operates in the load circuit 10 of FIGS. 1 and 2 when powered by an A.C. voltage applied to the load terminals 11 and 12 is illustrated by the voltage-current curves of FIG. 7 and by the time-current curves of FIG. 8. When the device 14, 19 is in its high resistance of blocking state or condition and the applied A.C. voltage is less than the threshold or breakdown voltage value of the device, the device remains in its high resistance or blocking state or condition as indicated at 35 in the left hand portions of FIGS. 7 and 8. When, however, the applied A.C. voltage is at least the threshold voltage value of the device, the device substantially instantaneously switches to its low resistance or conducting state or condition as indicated at 37 in the right hand portions of FIGS. 7 and 8. The memory type device has memory of its conducting state or condition and it remains in this conducting state or condition even though the applied voltage decreases below the threshold voltage value of the device, or decreases to zero or is removed entirely.

When the applied A.C. voltage is below the threshold voltage value of the device and the switch 30 in FIGS. 1 and 2 is then closed to apply a high current through the small resistance 31 to the control electrodes 17, 18 of FIG. 1 and 17, 15 of FIG. 2, the device is substantially instantaneously realtered or changed from its conducting state or condition to its blocking state or condition as illustrated in the left hand portions of FIGS. 7 and 8 and as described above.

The threshold voltage value of the devices 14, 19, while predetermined by the make-up, materials, dimensions and configurations of the devices, is also dependent upon the effective high resistance distance of the semiconductor material between the load electrodes 15 and 16 of the device, upon the current density and field near at least one of the load electrodes, and/or upon the temperature near at least one of the load electrodes. One or more of these conditions affecting the threshold voltage values of the devices are controlled, in accordance with this invention, by the control electrodes 17, 18 of FIG. 1, and 17, 15 of FIG. 2 arranged in the control circuits 25 therefor for switching the devices from their high resistance or blocking condition to their low resistance or conducting condition.

For purposes of illustration, reference is made to FIG. 1 wherein the four electrode device 14 is included in the load circuit 10 and it is assumed that the device has a normal threshold voltage, of say 110 volts, and that the voltage applied to the load electrodes 15 and 16 by the load voltage source $V_A$ is less than said threshold voltage value, say 100 volts. The device 14 is in its high resistance or blocking condition and the electric field 32 produced by the applied voltage, is substantially evenly distributed through the semiconductor material and is substantially constant between the load electrodes 15 and 16. However, the resistance between the load electrodes may be decreased somewhat by the applied voltage but not enough to allow breakdown of the material between these electrodes. When the switch 28 in the control circuit 25 is closed, a voltage is applied to the control electrodes 17 and 18 through the high resistance 29 by the control voltage source $V_C$ and this produces an electric field 33 between the control electrodes which lowers the resistance of the path between the control electrodes in the manners described above in connection with the path between the load electrodes. The control voltage applied to the control electrodes may be less than a breakdown value or it may be greater than a breakdown value to provide a large reduction in resistance between the control electrodes.

In either event, a section of the semiconductor material between the load electrodes is substantially decreased in resistance and provides a source of current carriers (where 32 and 33 overlap) and therefore the effective high resistance distance between the load electrodes 15 and 16 is decreased, with the result that the electric field 32 is increased above its breakdown value or, in other words, the breakdown voltage value of the device between the load electrodes 15 and 16 is lowered from its normal 110 volt value to a value below the 100 volt value of the voltage applied by the load voltage source $V_A$. This lowering of the threshold voltage value of the device to a value below the value of the applied voltage corresponds to raising the applied voltage above the threshold voltage value and, as a result, the device "switches" from its blocking state or condition to its conducting state or condition as described above.

Also, for purposes of illustration, reference is made to FIG. 2 wherein the three electrode device 19 is included in the load circuit 10 and it is also assumed that this device has a normal threshold voltage value of 110 volts and that the value of voltage applied to the load electrodes 15 and 16 is 100 volts. Here, also, the device 19 is in its high resistance or blocking condition and the electric field 32, produced by the applied voltage $V_A$, is substantially evenly distributed and is substantially constant between the load electrodes 15 and 16. When the switch 28 in the control circuit 25 is closed, a voltage is applied to the electrodes 17 and 15 through the high resistance 29 by the control voltage source $V_C$ and this produces an electric field 33 between the electrodes 17 and 15 which also lowers the resistance of the path between these electrodes in the manners described above in connection with the path between the load electrodes. Here, also, the control voltage may be less than a breakdown value or it may be greater than a breakdown value to provide a large reduction in resistance between these electrodes 17 and 15.

Here again, as above, a portion of the semiconductor material between the load electrodes 15 and 16 is decreased substantially in resistance and provides a source of current carriers (where 32 and 33 overlap) and, therefore, the effective high resistance distance between the load electrodes is decreased, with the result that the breakdown voltage value of the device is lowered from its normal 110 volt value to a value below the 100 volt value of the applied voltage to cause the device to "switch" from its blocking state or condition to its conducting state or condition. Furthermore, the electric field 33 produced by the control circuit where it overlaps the electric field 32 produced by the load circuit may heat the semiconductor material adjacent the electrode 15 to initiate or assist in initiating thermal breakdown of the semiconductor material between the load electrodes 15 and 16, and may increase the current density and field strength adjacent the electrode 15 to initiate or assist in initiating electrical breakdown of the semiconductor material between the load electrodes 15 and 16, to cause the normal threshold voltage value of the device to decrease from its normal 110 volt value to a value below the 100 volt value of the applied voltage and, hence, cause the device to switch from its blocking state or condition to its conducting state or condition.

Where the four electrode device 14 of FIG. 1 or the three electrode device 19 of FIG. 2 are memory type devices, they remain in their conducting state or condition, they having memory of that state or condition, even though the switch 28 in the control circuit 25 is opened to allow for the normal 110 volt threshold voltage value of the devices, or even though the applied voltage $V_A$ to the load circuit is decreased to substantially zero or removed. To "switch" such memory devices to the blocking state or condition, even though the load voltage $V_A$ applied to the load electrodes 15 and 16 is at the aforementioned 100 volts, the switch 28 in the control circuit 25 is opened to prevent lowering of the threshold voltage value of the devices below their normal threshold voltage value of 110 volts, and the switch 30 in that branch of the control circuit 25 is manipulated to apply a high current pulse through the control electrodes 17 and 18 of FIG. 1 or electrodes 17 and 15 of FIG. 2 for altering at least parts of the portions or paths 32 from their low resistance crystalline like conducting state to their high resistance amorphous like blocking state, as described above. The memory type devices may then again be "switched" to their conducting state or condition by at least momentarily closing the switch 28 in the control circuit 25, as described above.

Where the four electrode device 14 of FIG. 1 or the three electrode device 19 of FIG. 2 are non-memory type devices, they remain in their conducting state or condition only so long as the current therethrough is above a minimum current holding value as expressed above. Thus, such devices will continue to conduct current until the applied voltage $V_A$ near zero, whereupon they will change to their blocking state or condition. Where the applied voltage $V_A$ is a steady D.C. voltage, it must again be raised to the 100 volt value and then the switch 28 closed to switch the devices to their conducting state or condition. Where the applied voltage $V_A$ is an A.C. or a pulsating D.C. voltage, having a peak value of 100 volts, and the switch 28 is closed to lower the threshold voltage values of the devices to 100 volts, they will switch to the conducting state or condition each time that the instantaneous voltage reaches 100 volts and will switch to the blocking state or condition each time that the instantaneous applied voltage nears zero as described above. Thus, so long as the switch 28 remains closed, the devices will continue to provide such interrupted or modified conduction. When the switch 28 is opened, the devices assume their blocking state or condition. Where the geometry of the non-memory devices is such, or the frequencies of the applied A.C. or pulsating D.C. voltages are such, that heat generated in the devices cannot be completely dissipated during the non-conducting intervals of the devices, the temperature of the devices may increase to automatically lower the threshold voltage value of the devices for continued operation, and if the threshold voltage value of the devices should be so lowered below the aforementioned 100 volt value, the devices will continue their interrupted or modified conduction even though the switch 28 is subsequently opened. This may be beneficial where such continued conduction is desired as the result of only momentarily closing the switch 28.

As expressed above, the voltage sources $V_A$ and $V_C$ may be steady D.C., pulsating D.C. or A.C. sources depending upon the particular operation and control desired and this is true for both the memory type and non-memory type devices. The control circuits 25 for switching the devices from their blocking conditions to their conducting conditions are preferably high resistance circuits for substantially isolating the control circuits 25 from the load circuits 10 and for preventing possible short circuits in the load circuit, especially as illustrated in FIG. 2. This is one of the reasons for using the high resistance 29 in FIGS. 1 and 2. Instead of using such high resistances 29, the control electrodes 17 and/or 18 may themselves be made of high resistance materials, such as tantalum oxide or the like, and such an arrangement would be particularly desirable in printed circuits and microcircuits or the like where the high resistance would be built into the current controlling devices themselves.

The three electrode and four electrode current controlling devices 19 and 14 may have a wide variety of configurations other than those diagrammatically illustrated in FIGS. 1 and 2. For example, various forms of the three electrode devices 19 are illustrated in FIGS. 9 to 14 and various forms of the four electrode devices are illustrated in FIGS. 15 to 17. All of these devices operate in the manner described above in connection with the devices of FIGS. 1 and 2. In FIG. 9 the device 19 has the control electrode 17 on the same side of the device as the load electrode 16. In FIG. 10 the three electrode device 19 has the load electrodes 15 and 16 on the same side of the device. In FIG. 11 the load electrodes 15 and 16 and the control electrode 17 are all arranged on the same side of the device. In FIGS. 12 and 13 a generally cylindrical device 19 is utilized with the load electrodes 15 and 16 arranged on opposite faces thereof. Here, the control electrode 17 is an annular electrode around the load electrode 16 and here the electric field 33 produced by the annular control electrode 17 is conically directed toward the load electrode 15. In FIG. 14 the load electrodes 15 and 16 are arranged on the surface of a substrate and face toward each other and the control electrode 17 is also arranged on the substrate and faces toward the load electrodes 15 and 16. The semiconductor material is carried by the substrate and is arranged between and in contact with the electrodes 15, 16 and 17, the electric field 32 extending through the semiconductor material between the load electrodes 15 and 16 and the electric field 33 extending between the electrodes 15 and 17.

FIG. 15 illustrates a four electrode device 14 which is similar to the three electrode device 19 of FIG. 14, the four electrode device including the additional control electrode 18. In FIG. 16 the four electrode device 19 has an hour glass configuration with the control electrodes 17 and 18 being at the waist of the device. This construction operates to concentrate the electric field 32 adjacent the control electrodes 17 and 18. The four electrode device 14 of FIG. 17 is like that of FIG. 16 except that insulating layers 40 are interposed between the semiconductor material and the control electrodes 17 and 18. These insulating layers 40 between the control electrodes and the semiconductor material operate to form capacitors so as to D.C. isolate the control circuit from the load circuit.

FIGS. 18 to 23 illustrate various arrangements of the control circuit 25 as applied to the three electrode devices 19. It is understood that similar control circuit arrangements are applicable to the four electrode devices, the differences between such circuits corresponding to the differences between the control circuits of FIGS. 1 and 2.

In FIG. 18, the control circuit 25 includes a variable resistance element 41 for regulating the control voltage applied to the control electrode 17 for varying the threshold voltage value of the device 19 as the variable resistance 41 is varied. In this connection a decrease in the variable resistance 41 operates to lower the threshold voltage value of the device 19. The variable resistance 41 may be mechanically operated or it may be varied in response to a variable condition affecting the same. In the latter event the variable resistance device 41 would have a condition-resistance coefficient. The condition-resistance coefficient may be negative or positive. Where the coefficient is negative, the resistance of the variable resistance 41 decreases as the value of the condition increases, and where the condition-resistance coefficient is positive the resistance of the variable resistance increases as the value of the condition increases. The variable resistance 41 may respond to various conditions affecting the same, as for example, moisture where it would have a moisture-resistance coefficient, pressure where it would have a pressure-resistance coefficient, light where it would have a light-resistance coefficient or temperature where it would have a temperature-resistance coefficient.

FIG. 19 is like FIG. 18 except that the control electrode, here designated 42, is a high resistance material having a condition-responsive coefficient for controlling the threshold voltage value of the device 19 in accordance with the value of a condition affecting the control electrode 42. In other words, the variable resistance 41 of FIG. 18 is incorporated in the control electrode 42. The arrangement of FIG. 19 is particularly advantageous for printed circuit or microcircuit arrangements or the like wherein the condition responsive control electrode 42 forms an integral part of the current controlling device 19.

The control electrodes 42 should have a substantial resistance and they should contain materials which respond to the condition affecting the same so as to make a substantial change in the resistance of the control electrode in response to changes in the condition. Where the control electrode 42 responds to moisture conditions, they should include substantial moisture responsive resistance materials. Such moisture responsive resistance materials should be substantially water-insoluble or only slightly water-soluble, preferably having a solubility below 15 parts per 100 parts of cold water and, better still, a solubility below 8 parts per 100 parts of cold water. Among such materials, for example, are lithium compounds, such as, lithium carbonate, lithium hydroxide, lithium orthosilicate, lithium sulfate, lithium metasilicate, lithium metaborate, lithium fluoride, lithium orthophosphate and mixtures of any two or more thereof, these materials having large negative moisture-resistance coefficients.

Where the control electrodes 42 are responsive to pressure applied thereto they may be made relatively resilient or flexible and may include carbon particles or the like so that when the pressure applied to the electrodes 42 increases the carbon particles are compacted to decrease the resistance of the control electrodes 42. Such electrodes would, therefore, have a substantial negative pressure-resistance coefficient.

Where the control electrodes 42 respond to light they may include compounds made up from elements in classes II and VI of the periodic table such as, cadmium sulfide, lead selenide, lead sulfide, zinc telluride, silver telluride, zinc selenide, cadmium selenide and the like. Such materials exhibit a substantial negative light-resistance coefficient.

Where the control electrodes 42 are to respond to temperature they may include compounds taken from groups II and VI of the periodic table, such compounds having substantial negative-temperature resistance coefficients. Thus, as the temperature affecting the control electrodes 42 increase the resistance of the control electrodes decrease substantially. The control electrodes 42 may also include positive temperature coefficient materials for decreasing the resistance of the control electrodes upon decrease in temperature affecting the same. Such materials may include barium titanate or the like.

FIG. 20 discloses a circuit arrangement similar to that of FIG. 2 but here the control circuit 25 includes a condenser 43 for D.C. isolating the control circuit 25 from the load circuit 10. FIG. 21 is like FIG. 20 but instead of including a separate capacitor 43 an insulating layer 41 is interposed between the control electrode 17 and the semiconductor material of the device. This insulating layer 41 forms a capacitor between the electrodes 17 and the semiconductor material and has the same effect as the condenser 43 of FIG. 20 for D.C. isolating the control circuit 25 from the load circuit 10. Reference to this feature has been made above in connection with FIG. 17.

In FIG. 22 a rectifier 44 is included in the control circuit 25 so that the control voltage can be applied to the control electrodes 17 in only a single direction. In FIG. 23, a rectifying junction 45 is interposed between the control electrode 17 and the semiconductor material 19, this rectifying junction 45 having the same rectifying effect as the separate rectifier 44. The arrangements of FIGS. 21 and 23 having the insulating layer 41 and the rectifying junction 45 are particularly useful in connection with printed circuits or microcircuits or the like since the insulating layer 41 and the rectifying junction 45 may be integrally incorporated in the current controlling devices.

While for purposes of illustration various forms of this invention have been disclosed, other forms thereof may become apparent to those skilled in the art upon reference to this disclosure and, therefore, this invention should be limited only by the scope of the appended claims.

I claim:

1. In combination, a symmetrical current controlling device for an electrical load circuit including semiconductor material means and load electrodes in non-rectifying contact therewith for connecting the same in series in said electrical load circuit, said semiconductor material means being of one conductivity type, said semiconductor material means including means for providing a first condition of relatively high resistance for substantially blocking current therethrough between the load electrodes substantially equally in each direction, said semiconductor material means including means responsive to a voltage of at least a threshold value in either or alternately in both directions applied to said load electrodes for altering said first condition of relatively high resistance of said semiconductor material means for substantially instantaneously providing at least one path, through said semiconductor material means between the load electrodes, having a second condition of relatively low resistance for conducting current therethrough between the load electrodes substantially equally in each direction, said semiconductor material means including means for providing the current controlling device with a normal threshold voltage value, said current controlling device including at least one control electrode, electrically coupled to said semiconductor material means, for connecting the semiconductor material means in series in an electrical control circuit, said semiconductor material means including means responsive to a voltage in either direction or alternately in both directions applied to said at least one control electrode for decreasing the normal threshold voltage value of the current controlling device, said electrical load circuit including a voltage source for applying to the load electrodes of the current controlling device a voltage which is less than the normal threshold voltage value of the current controlling device, and said electrical control circuit including a voltage source for applying a voltage to said at least one control electrode for decreasing the normal threshold voltage value of the current controlling device to a value below the voltage applied to the load electrodes by the load circuit for altering said first relatively high resistance blocking condition to said second relatively low resistance conducting condition.

2. The combination of claim 1 wherein said semiconductor material means includes means for maintaining said at least one path of said semiconductor material means between the load electrodes in its said second relatively low resistance conducting condition above a minimum current holding value, said semiconductor material means includes means responsive to a decrease in current, through said at least one path between said load electrodes in its said second low resistance conducting condition, to a value below said minimum current holding value for immediately causing realtering of said second relatively low resistance conducting condition of said at least one path to said relatively high resistance blocking condition, and said load circuit includes means for decreasing the voltage applied to said load electrodes for decreasing the current below said holding value for realtering said second relatively low resistance conducting condition to said first relatively high resistance blocking condition.

3. The combination of claim 2 wherein said control circuit also controls the minimum current holding value below which said second relatively low resistance conducting condition is realtered to said first relatively high resistance blocking condition.

4. The combination of claim 2 wherein the voltage source for the load circuit is an A.C. voltage source for applying an A.C. voltage to the load circuit, said first relatively high resistance blocking condition is altered to said second relatively low resistance conducting condition when the normal threshold voltage value of the current controlling device is decreased to at least the peak value of the A.C. voltage applied to the load terminals of the current controlling device, and said second relatively low resistance conducting condition is realtered to said first relatively high resistance blocking condition when the instantaneous current between the load terminals decreases below said minimum current holding value, whereby said second relatively low resistance conducting condition is realtered to said relatively high resistance blocking condition during each half cycle of the A.C. voltage and said first relatively high resistance blocking condition is altered to said relatively low resistance conducting condition during each half cycle of the A.C. voltage so long as the threshold voltage value of the current controlling device is less than the peak voltage for the A.C. voltage.

5. The combination of claim 1 wherein said semiconductor material means includes means for maintaining said at least one path of said semiconductor material means between said load electrodes in its said second relatively low resistance conducting condition even in the absence of current therethrough, said semiconductor material means includes means responsive to a current pulse of at least a threshold value in either direction or alternately in both directions applied to said at least one control electrode for substantially instantaneously realtering said second relatively low resistance conducting condition of said at least one path between the load electrodes to said first relatively high resistance blocking condition, and said electrical control circuit includes a current source for applying a current pulse of at least said current threshold value to said at least one control electrode for realtering said second relatively low resistance conducting condition to said first relatively high resistance blocking condition.

6. The combination of claim 5 wherein the voltage source for the load circuit is an A.C. voltage source for applying an A.C. voltage to the load circuit, and said first relatively high resistance blocking condition is altered to said second relatively low resistance conducting condition when the normal threshold voltage value of the current controlling device is decreased to at least the peak value of the A.C. voltage applied to the load terminals of the current controlling device.

7. The combination of claim 1 wherein said at least one control electrode comprises two control electrodes for connecting said semiconductor material means in series in said control circuit.

8. The combination of claim 1 wherein said at least one control electrode comprises one control electrode and one of said load electrodes for connecting said semiconductor material means in series in said control circuit.

9. The combination of claim 1 wherein the voltage source for the load circuit is an A.C. voltage source for applying an A.C. voltage to the load circuit, and said first relatively high resistance blocking condition is altered to said second relatively low resistance conducting condition when the normal threshold voltage value of the current controlling device is decreased to at least the peak value of the A.C. voltage applied to the load terminals of the current controlling device.

10. The combination of claim 1 wherein said control circuit is a high resistance circuit for substantially isolating the control circuit from the load circuit.

11. The combination of claim 1 wherein said at least one control electrode comprises high resistance material for substantially isolating the control circuit from the load circuit.

12. The combination of claim 1 wherein said control circuit is an A.C. or pulsating D.C. control circuit.

13. The combination of claim 12 wherein said control circuit includes a series capacitor for isolating the D.C. potential of the load circuit from the control circuit.

14. The combination of claim 12 wherein said at least one control electrode is insulated from said semiconductor material means to form a capacitor for isolating the D.C. potential of the load circuit from the control circuit.

15. The combination of claim 1 wherein said control circuit includes a rectifier.

16. The combination of claim 1 wherein a rectifying junction is disposed between said at least one control electrode and said semiconductor material means.

17. The combination of claim 1 wherein the control circuit includes a condition responsive control element having a condition-resistance coefficient for regulating the voltage applied by said at least one control electrode to said semiconductor material means for controlling the threshold voltage value of the current controlling device in accordance with the value of the condition affecting the control element.

18. The combination of claim 1 wherein said at least one control electrode includes means having a condition-resistance coefficient for further regulating the voltage applied to said semiconductor material means for controlling the threshold voltage value of the condition affecting said at least one control electrode.

19. In combination, a symmetrical current controlling device for an electrical load circuit including semiconductor material means and load electrodes in non-rectifying contact therewith for connecting the same in series in said electrical load circuit, said semiconductor material means being of one conductivity type, said semiconductor material means including means for providing a first condition of relatively high resistance for substantially blocking current therethrough between the load electrodes substantially equally in each direction, said semiconductor material means including means responsive to a voltage of at least a threshold value in either or alternately in both directions applied to said load electrodes for altering said first condition of relatively high resistance of said semiconductor material means for substantially instantaneously providing at least one path, through said semiconductor material means between the load electrodes, having a second condition of relatively low resistance for conducting current therethrough between the load electrodes substantially equally in each direction, said semiconductor material means including means for maintaining said at least one path of said semiconductor material means between said load electrodes in its said second relatively low resistance conducting condition even in the absence of current therethrough, said current controlling device including at least one control electrode, electrically coupled to said semiconductor material means, for connecting the semiconductor material means in series in an electrical control circuit, said semiconductor material means including means responsive to a current pulse of at least a threshold value in either direction or alternately in both directions applied to said at least one control electrode for substantially instantaneously realtering said second relatively low resistance conducting condition of said at least one path between the load electrodes to said first relatively high resistance blocking condition, and said electrical control circuit including a current source for applying a current pulse of at least said current threshold value to said at least one control electrode for realtering said second relatively low resistance conducting condition to said first relatively high resistance blocking condition.

20. The combination of claim 19 wherein said at least one control electrode comprises two control electrodes for connecting said semiconductor material means in series in said control circuit.

21. The combination of claim 19 wherein said at least one control electrode comprises one control electrode and one of said load electrodes for connecting said semiconductor material means in series in said control circuit.

22. The combination of claim 19 wherein said control circuit includes a condition responsive control element having a condition-resistance coefficient for regulating the value of the current pulse applied by said at least one control electrode to said semiconductor material means in accordance with the value of the condition affecting the control element.

23. The combination of claim 19 wherein said at least one control electrode includes means having a condition-resistance coefficient for further regulating the value of the current pulse applied to said semiconductor material means in accordance with the value of the condition affecting said at least one control electrode.

References Cited

UNITED STATES PATENTS

| | | | |
|---|---|---|---|
| 2,208,455 | 7/1940 | Glaser et al. | 317—237 |
| 2,900,531 | 8/1959 | Wallmark | 307—88.5 |
| 2,930,950 | 3/1960 | Teszner | 317—235 |
| 2,987,959 | 6/1961 | Kimmel | 317—237 |
| 3,056,888 | 10/1962 | Atalla | 307—88.5 |
| 3,102,230 | 8/1963 | Kahng | 307—88.5 X |
| 3,191,061 | 6/1965 | Weimer | 307—88.5 |
| 3,258,663 | 6/1966 | Weimer | 317—235 |

JAMES D. KALLAM, *Primary Examiner.*